United States Patent
Qin

(10) Patent No.: US 10,334,696 B2
(45) Date of Patent: Jun. 25, 2019

(54) ELECTRONIC DEVICE WITH A NIGHT-LIGHT FUNCTION AND NIGHT-LIGHT CONTROL METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Kan Qin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 140 days.

(21) Appl. No.: 15/605,896

(22) Filed: May 25, 2017

(65) Prior Publication Data

US 2017/0347429 A1  Nov. 30, 2017

(30) Foreign Application Priority Data

May 27, 2016 (CN) .......................... 2016 1 0360185

(51) Int. Cl.
    *H05B 37/02* (2006.01)
(52) U.S. Cl.
    CPC ..... *H05B 37/0218* (2013.01); *H05B 37/0227* (2013.01); *Y02B 20/44* (2013.01); *Y02B 20/46* (2013.01)

(58) Field of Classification Search
    CPC .................. H05B 37/0218; H05B 37/0227
    See application file for complete search history.

(56) References Cited

U.S. PATENT DOCUMENTS

| 2007/0075965 A1* | 4/2007 | Huppi ............... H04M 1/72563 345/156 |
| 2010/0296285 A1* | 11/2010 | Chemel .................. F21S 2/005 362/235 |
| 2016/0259459 A1* | 9/2016 | Yang .......................... G06F 3/01 |
| 2016/0302284 A1* | 10/2016 | Herman ............. H05B 37/0218 |

* cited by examiner

*Primary Examiner* — Douglas W Owens
*Assistant Examiner* — Pedro C Fernandez
(74) *Attorney, Agent, or Firm* — ScienBiziP, P.C.

(57) ABSTRACT

A night-light control method in an electronic device comprises controlling a photosensitive sensor to detect a light intensity value and controlling an acceleration sensor to detect an acceleration value of the electronic device and thus movement. Acquiring the acceleration value from the acceleration sensor when the acquired light intensity value is in the first preset light intensity range; determining whether the acquired acceleration value is in a preset acceleration range and controlling an infrared sensor to detect whether a user of the electronic device is moving when the acquired acceleration value is in the preset acceleration range. A display unit of the electronic device is controlled to emit light or control a light emitting unit of the electronic device to emit light when the user of the electronic device is moving.

14 Claims, 6 Drawing Sheets

ELECTRONIC DEVICE WITH A NIGHT-LIGHT FUNCTION AND NIGHT-LIGHT CONTROL METHOD

CROSS-REFERENCE TO RELATED APPLICATIONS

This application claims priority to Chinese Patent Application No. 201610360185.6 filed on May 27, 2016, the contents of which are incorporated by reference herein.

FIELD

The subject matter herein generally relates to electronic product field, especially relates to an electronic device with night-light function and night-light control method.

BACKGROUND

An electronic device with night-light function is popular and convenient for many uses.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
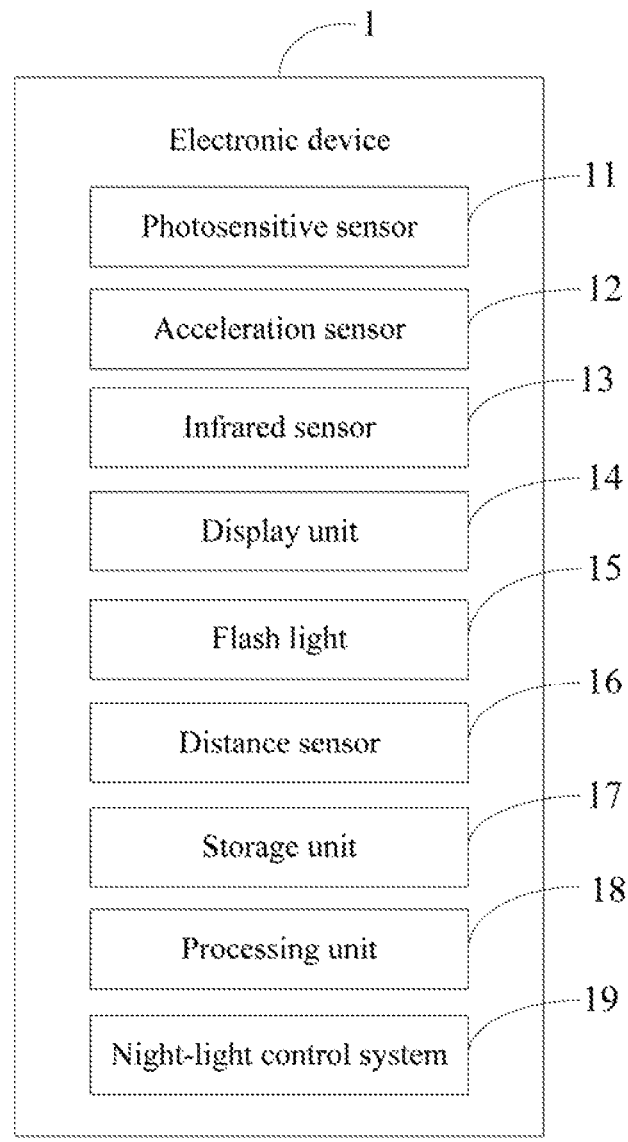
FIG. 1 is a block diagram illustrating an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

Figure 2:
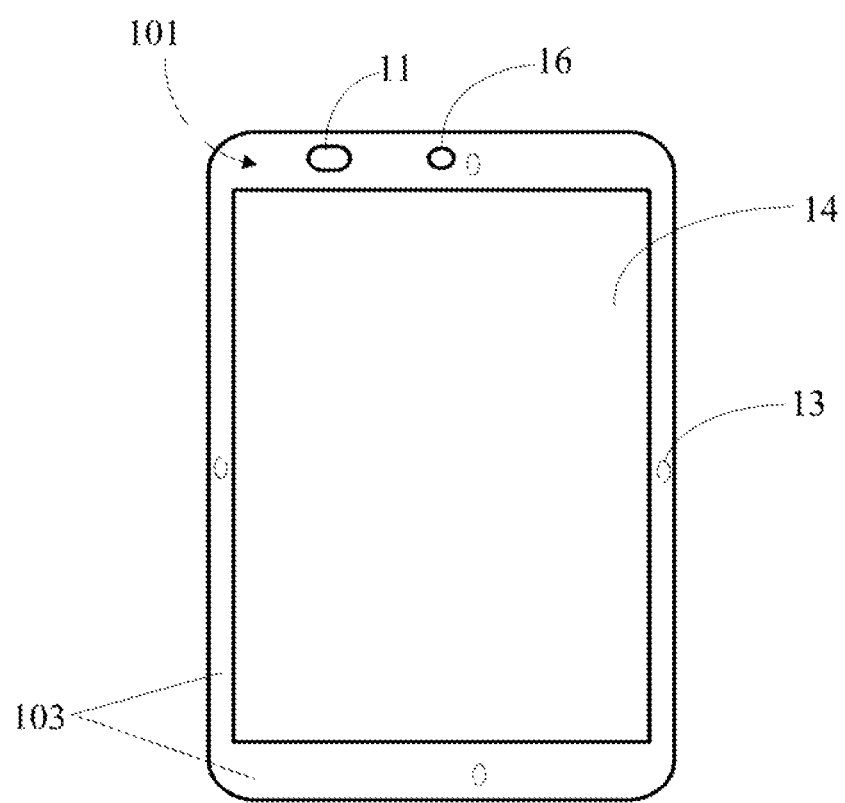
FIG. 2 is a front view of an exemplary embodiment of the electronic device of FIG. 1.
Figure 3:
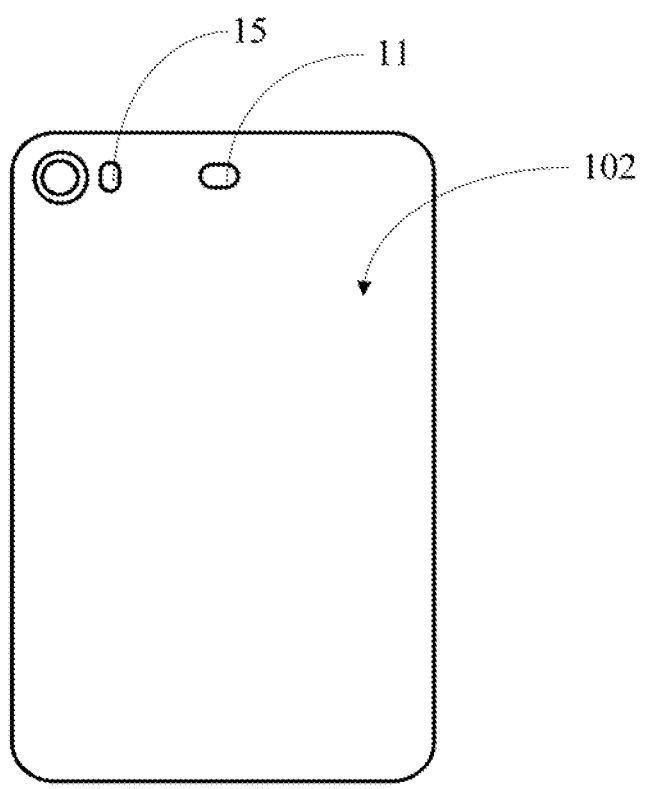
FIG. 3 is a rear view of the electronic device of FIG. 1.

FIG. 1 illustrates a block diagram illustrating an exemplary embodiment of an electronic device 1. The electronic device 1 includes two photosensitive sensors 11, an acceleration sensor 12, a number of infrared sensors 13, a display unit 14, a light emitting unit 15, a distance sensor 16, a storage unit 17, a processing unit 18, and a night-light control system 19. FIGS. 2-3 illustrate the electronic device 1. The electronic device 1 includes a first surface 101 and a second surface 102 on the opposite side of the first surface 101. The display unit 14 is mounted on the first surface 101. The first surface 101 defines four side edges 103. The four side edges 103 surround the display unit 14. In at least one exemplary embodiment, the display unit 14 can be a screen. The infrared sensors 13 are mounted on the four side edges 103. In at least one exemplary embodiment, the number of infrared sensors 13 is four. Each infrared sensor 13 is correspondingly mounted on one of the four side edges 103. The infrared sensor 13 detects when a user of the electronic device 1 moves. The light emitting unit 15 is mounted on the second surface 102. In at least one exemplary embodiment, the light emitting unit 15 can be a flash light. The distance sensor 16 is mounted on the first surface 101. The distance sensor 16 detects distance between the electronic device 1 and an object. In at least one exemplary embodiment, the distance sensor 16 detects at least one time interval between the time when the distance sensor 16 transmits the light pulse and the time when the distance sensor 16 receives the reflected light, and determines the distance according to the time interval. One of the two photosensitive sensors 11 is mounted on the first surface 101 near the distance sensor 16, the other of the two photosensitive sensors 11 is mounted on the second surface 102 near the light emitting unit 15. The two photosensitive sensors 11 are used to detect the light intensity value in the environment surrounding the electronic device 1. The acceleration sensor 12 is mounted on the motherboard (not shown) of the electronic device 1. The acceleration sensor 12 detects the acceleration value of the electronic device 1.

The storage unit 17 stores a first preset light intensity range, a second preset light intensity range, a preset distance range, and a preset acceleration range. In at least one exemplary embodiment, the first storage unit 17 can include various types of non-transitory computer-readable storage mediums. For example, the storage unit 17 can be an internal storage system of the electronic device 1, such as a flash memory, a random access memory (RAM) for temporary storage of information, and/or a read-only memory (ROM) for permanent storage of information. The storage unit 17 can also be an external storage system, such as a hard disk, a storage card, or a data storage medium. In at least one exemplary embodiment, the processing unit 18 can be a central processing unit (CPU), a microprocessor, or other data processor chip that performs functions of the night-light control system 19.

Figure 4:
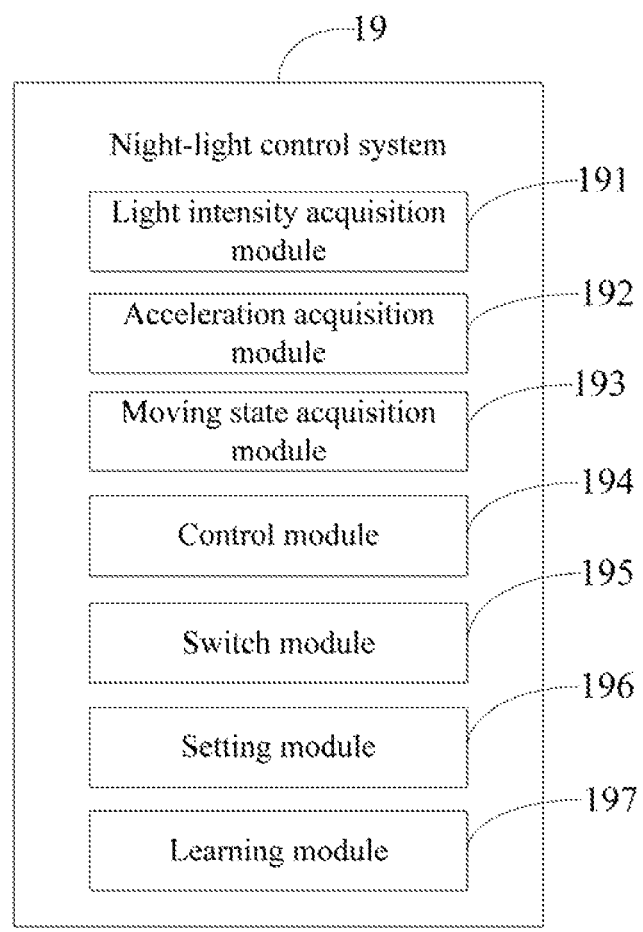
FIG. 4 is a functional block diagram of a night-light system in the device of FIG. 1.

FIG. 4 illustrates the night-light control system 19. In at least one exemplary embodiment, the system 19 includes a light intensity acquisition module 191, an acceleration acquisition module 192, a moving state acquisition module 193, a control module 194, a switch module 195, a setting module 196, and a learning module 197. The modules 191-197 of the system 19 can be collections of software instructions. In at least one exemplary embodiment, the software instructions of the light intensity acquisition module 191, the acceleration acquisition module 192, the moving state acquisition module 193, the control module 194, the switch module 195, the setting module 196, and the learning module 197 are stored in the storage unit 17 and executed by the processing unit 18.

The light intensity acquisition module 191 controls the photosensitive sensors 11 to detect the light intensity value in the environment surrounding the electronic device 1 and acquire the light intensity value from the photosensitive sensors 11.

The acceleration acquisition module 192 determines whether the acquired light intensity value is in the first preset light intensity range, and control the acceleration sensor 12 to detect the acceleration value of the electronic device 1, and acquire the acceleration value from the acceleration sensor 12 when the acquired light intensity value is in the first preset light intensity range. In at least one exemplary embodiment, the light intensity value in the first preset light intensity range corresponds to the intensity value of the dark environment.

The moving state acquisition module 193 determines whether the acquired acceleration value is in the preset acceleration range, and control the infrared sensors 13 to detect whether the user of the electronic device 1 is moving when the acquired acceleration value is in the preset acceleration range. In at least one exemplary embodiment, the preset acceleration range can be pre-measured by experiment when the user holds the electronic device 1. In at least one exemplary embodiment, when the acquired acceleration value by the acceleration acquisition module 192 is in the preset acceleration range, the moving state acquisition module 193 determines that the electronic device 1 is being used by the user. Otherwise, the moving state acquisition module 193 determines that the electronic device 1 is not being used by the user. When the acquired acceleration value is in the preset acceleration range, namely, when the electronic device 1 is being used by the user, the moving state acquisition module 193 further determines, through infrared sensors 13, whether the user is moving.

The control module 194 controls the display unit 14 to emit light or control the light emitting unit 15 to emit light when the moving state acquisition module 193 determines that the user of the electronic device 1 is moving.

In at least one exemplary embodiment, the control module 194 further controls the distance sensor 16 to detect the distance between the electronic device 1 and a target object. In at least one exemplary embodiment, the target object can be human body, a desk, or a ceiling. For example, when the electronic device 1 is placed on a desk and the distance sensor 16 of the electronic device 1 is pointed toward the desk, the control module 194 controls the distance sensor 16 to detect the distance between the electronic device 1 and the desk. When the electronic device 1 is placed on the desk and the distance sensor 16 of the electronic device 1 is pointed toward a ceiling, the control module 194 controls the distance sensor 16 to detect the distance between the electronic device 1 and the ceiling. When a user holds the electronic device 1 and the distance sensor 16 of the electronic device 1 is pointed toward the user, the control module 194 controls the distance sensor 16 to detect the distance between the electronic device 1 and the user.

The control module 194 further determines whether the detected distance is in the preset distance range, and controls the light emitting unit 15 mounted on the second surface 102 to emit light for lighting when the detected distance is in the preset distance range, or can control the display screen 14 mounted on the first surface 101 to emit light for lighting when the detected distance is not in the preset distance range. Thus, the electronic device 1 can have night-light function. In at least one exemplary embodiment, the preset distance range can be a range between 0 centimeter to 10 centimeter. Namely, when the detected distance is in the range between 0 centimeter to 10 centimeter, the control module 194 controls the light emitting unit 15 on the second surface 102 to emit light; when the detected distance is not in the range between 0 centimeter to 10 centimeter, the control module 194 controls the display screen 14 mounted on the first surface 101 to emit light.

In at least one exemplary embodiment, the control module 194 further determines whether the light intensity value is in the second preset light intensity range, and turns off the night-light function of the electronic device 1 when the light intensity value is in the second preset light intensity range. In at least one exemplary embodiment, the light intensity value in the second preset light intensity range enables the user to see clearly in the environment of the electronic device 1.

Figure 5:
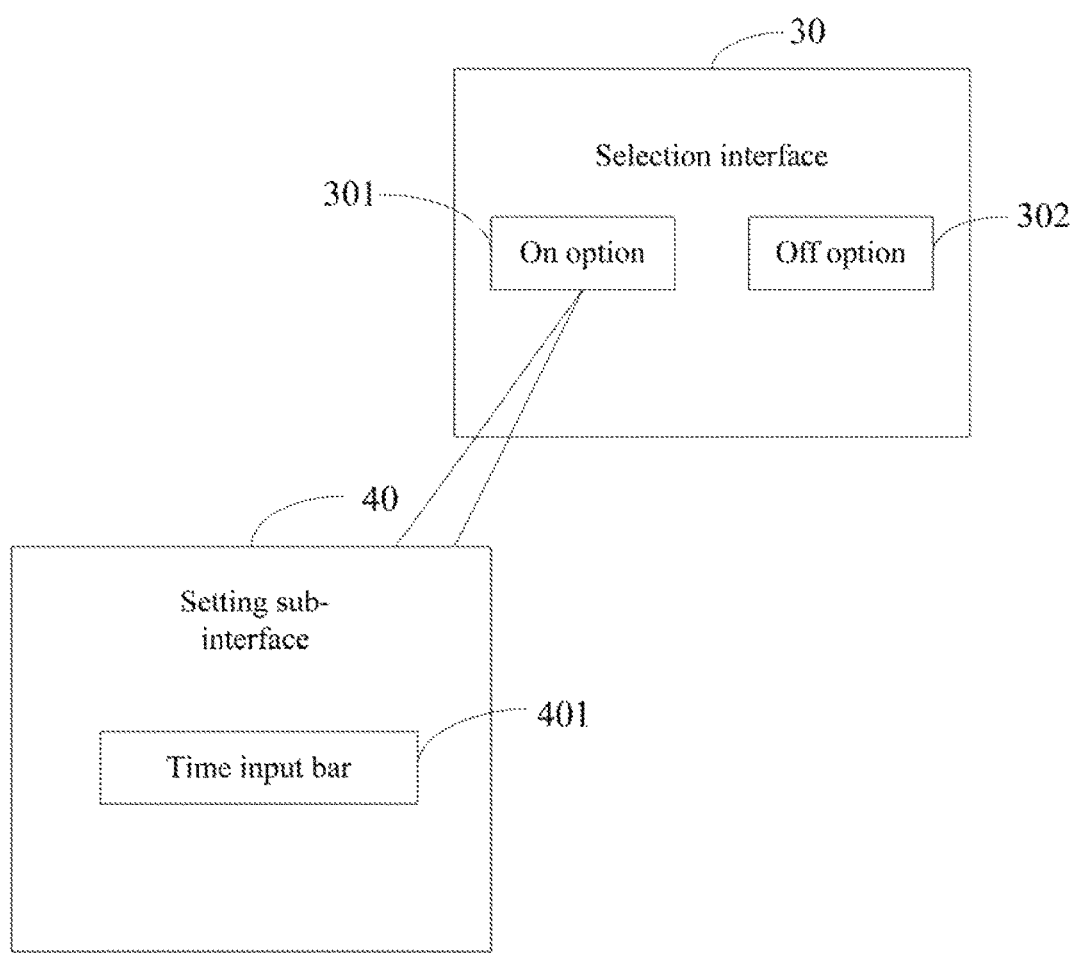
FIG. 5 is a diagram of a selection interface in the device of FIG. 1.

The switch module 195 turns on/off the night-light function of the electronic device 1 in response to a turning on or a turning off operation input by the user. In at least one exemplary embodiment, the switch module 195 displays a selection interface 30 (referring to FIG. 5) on the display screen 14. The selection interface 30 includes an on option 301 and an off option 302. The switch module 195 turns on the night-light function of the electronic device 1 when the user selects the on option 301 of the selection interface 30. The switch module 195 turns off the night-light function of the electronic device 1 when the user selects the off option 301 of the selection interface 30.

The setting module 196 displays a setting sub-interface 40 (referring to FIG. 5) on the selection interface 30 for setting an execution time of the night-light function, and execute the night-light function at the execution time. In at least one exemplary embodiment, the setting sub-interface 40 includes a time input bar 401. The user can set the execution time of the night-light function through the time input bar 401. For example, the user can set the execution time of the night-light function as 10 pm today to 6 am tomorrow.

The learning module 197 stores and marks a target time when the light intensity value detected by the photosensitive sensors 11 is in the first light intensity range, and stores the frequency of occurrence of the target time. The learning module 197 further determines whether the occurring frequency of the target time is more than a preset frequency, and automatically turns on the night-light function of the electronic device 1 at the target time when the occurring frequency of the target time is more than the preset frequency. In at least one exemplary embodiment, as the light intensity value in first preset light intensity range corresponds to the intensity value of the dark environment, the target time can be the time after turning off the light at night.

For example, the user of the electronic device 1 can usually turn off the light at 10 o'clock pm, thus turning off the light at 10 o'clock pm is user's habit and the target time will be set as 10 o'clock pm. When the learning module 197 determines the occurring frequency of turning off the light at 10 o'clock pm is more than a preset frequency, the learning module 197 automatically turns on the night-light function of the electronic device 1 at 10 o'clock pm.

Figure 6:
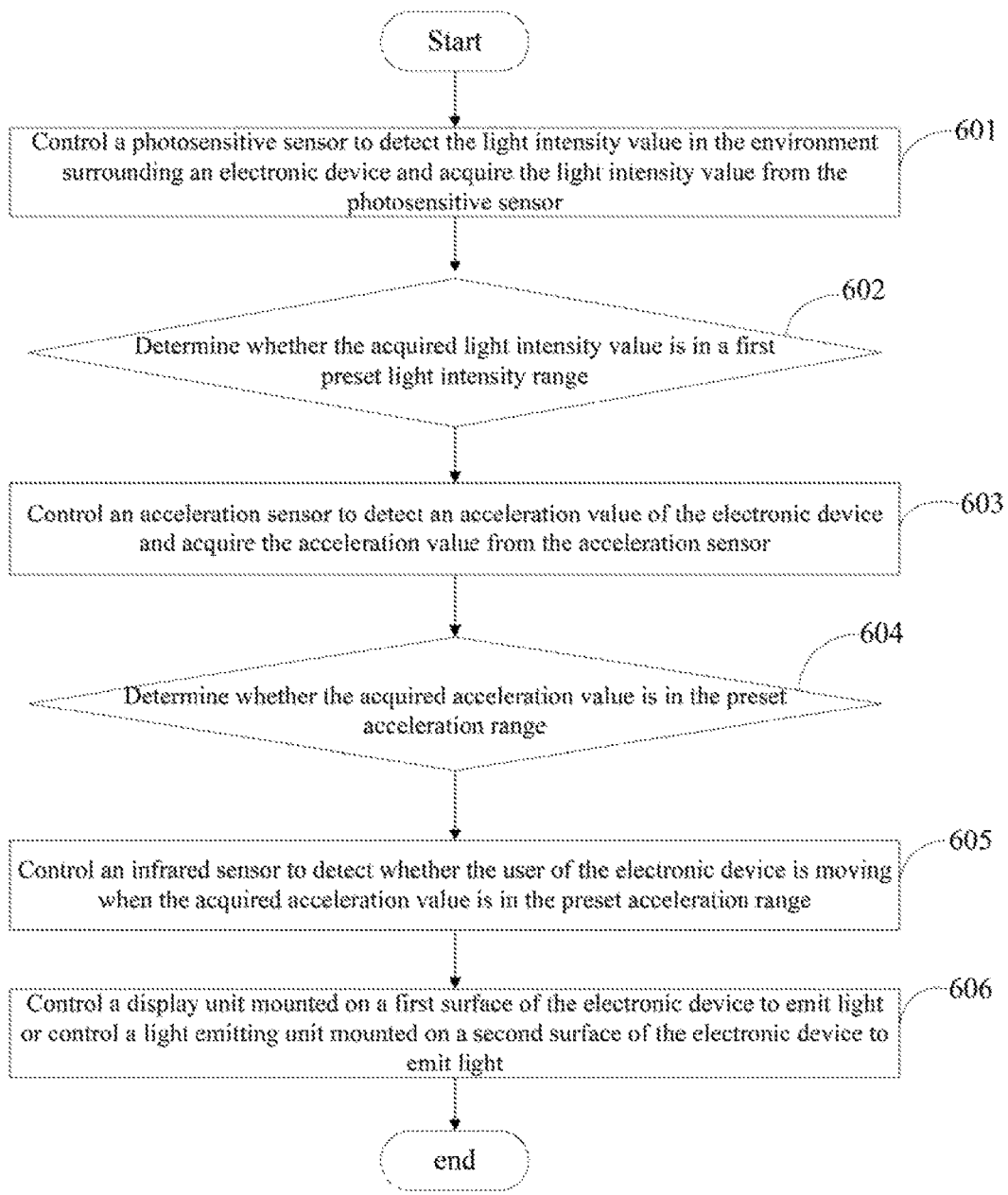
FIG. 6 is a flowchart of an exemplary embodiment of a night-light control method.

FIG. 6 illustrates a flowchart of an exemplary embodiment of a night-light control method. The method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 601.

At block 601, an electronic device controls a photosensitive sensor to detect the light intensity value in the environment surrounding the electronic device and acquire the light intensity value from the photosensitive sensor.

At block 602, the electronic device determines whether the acquired light intensity value is in a first preset light intensity range.

At block 603, the electronic device controls an acceleration sensor to detect an acceleration value of the electronic device and acquire the acceleration value from the acceleration sensor when the acquired light intensity value is in the first preset light intensity range.

At block 604, the electronic device determines whether the acquired acceleration value is in the preset acceleration range.

At block 605, the electronic device controls an infrared sensor to detect whether the user of the electronic device is moving when the acquired acceleration value is in the preset acceleration range.

At block 606, the electronic device controls a display unit mounted on a first surface of the electronic device to emit light or control a light emitting unit mounted on a second surface of the electronic device to emit light when determining the user of the electronic device is moving.

In at least one exemplary embodiment, the method further includes: the electronic device controls a distance sensor to detect distance between the electronic device and a target object toward the distance sensor, determines whether the detected distance is in a preset distance range, controls the light emitting unit to emit light for lighting when the detected distance is in the preset distance range, or controls the display screen to emit light for lighting when the detected distance is not in the preset distance range.

In at least one exemplary embodiment, the method further includes: the electronic device turns on/off night-light function of the electronic device in response to a turning on/off operation input by the user. In at least one exemplary embodiment, the electronic device displays a selection interface including an on option and an off option, turns on the night-light function of the electronic device when the user selects the on option, or turns off the night-light function of the electronic device when the user selects the off option.

In at least one exemplary embodiment, the method further includes: the electronic device displays a setting sub-interface for setting the execution time of the night-light function, and executes the night-light function at the execution time.

In at least one exemplary embodiment, the method further includes: the electronic device stores and marks a target time when the light intensity value is in the first light intensity range and the frequency of occurrence of the target time, determines whether the occurring frequency of the target time is more than a preset frequency, and automatically turns on the night-light function of the electronic device at the target time when the occurring frequency of the target time is more than the preset frequency.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. An electronic device with a night-light function comprising:
    at least one photosensitive sensor detecting light intensity value in the environment surrounding the electronic device;
    an acceleration sensor detecting acceleration value of the electronic device;
    at least one infrared sensor detecting whether a user of the electronic device moves;
    a display unit mounted on a first surface of the electronic device;
    a light emitting unit mounted on a second surface opposite to the first surface;
    a distance sensor mounted on the first surface;
    a processing unit coupled to the at least one photosensitive sensor, the acceleration sensor, the at least one infrared sensor, the display unit, and the light emitting unit; and
    a non-transitory storage medium coupled to the processing unit and storing a plurality of instructions, and causing the electronic device to:
        control the at least one photosensitive sensor to detect the light intensity value in the environment surrounding the electronic device and acquire the light intensity value from the at least one photosensitive sensor;
        determine whether the acquired light intensity value is in a first preset light intensity range;
        control the acceleration sensor to detect the acceleration value of the electronic device, and acquire the acceleration value from the acceleration sensor when the acquired light intensity value is in the first preset light intensity range;
        determine whether the acquired acceleration value is in a preset acceleration range;
        control the at least one infrared sensor to detect whether the user of the electronic device is moving when the acquired acceleration value is in the preset acceleration range; and
        control the distance sensor to detect a distance between the electronic device and an object when the user of the electronic device is moving;

determine whether the detected distance is in a preset distance range between 0 centimeter to 10 centimeter;
control the light emitting unit mounted on the second surface of the electronic device to emit light for lighting when the detected distance is in the preset distance range, or
control the display screen mounted on the first surface of the electronic device to emit light for lighting when the detected distance is not in the preset distance range.

2. The electronic device as recited in claim 1, wherein the light intensity value in the first preset light intensity range corresponds to the intensity value of the dark environment.

3. The electronic device as recited in claim 1, wherein the plurality of instructions further cause the electronic device to:
determine whether the light intensity value is in a second preset light intensity range; and
turn off the night-light function of the electronic device when the light intensity value is in the second preset light intensity range.

4. The electronic device as recited in claim 1, wherein the plurality of instructions further cause the electronic device to:
turn on /off the night-light function of the electronic device in response to a turning on operation or a turning off operation.

5. The electronic device as recited in claim 4, wherein the plurality of instructions further cause the electronic device to:
display a selection interface on the display screen, wherein the selection interface comprises an on option and an off option;
turn on the night-light function of the electronic device when the user selects the on option of the selection interface; or
turn off the night-light function of the electronic device when the user selects the off option of the selection interface.

6. The electronic device as recited in claim 1, wherein the plurality of instructions further cause the electronic device to:
display a setting sub-interface for setting an execution time of the night-light function of the electronic device, and execute the night-light function at the execution time.

7. The electronic device as recited in claim 1, wherein the plurality of instructions is further causing the electronic device to:
store and mark a target time when the light intensity value detected by the photosensitive sensors is in the first light intensity range, and store and mark a frequency of occurrence of the at least one target time;
determine whether the occurring frequency of the target time is more than a preset frequency; and
turn on the night-light function of the electronic device at the target time when the occurring frequency of the target time is more than the preset frequency.

8. A night-light control method applied in an electronic device with a night-light function, the method comprising:
control at least one photosensitive sensor to detect a light intensity value in the environment surrounding the electronic device and acquire the light intensity value from the at least one photosensitive sensor;
determine whether the acquired light intensity value is in a first preset light intensity range;
control an acceleration sensor to detect an acceleration value of the electronic device, and acquire the acceleration value from the acceleration sensor when the acquired light intensity value is in the first preset light intensity range;
determine whether the acquired acceleration value is in a preset acceleration range;
control at least one infrared sensor to detect whether a user of the electronic device is moving when the acquired acceleration value is in the preset acceleration range; and
control a distance sensor to detect a distance between the electronic device and an object when the user of the electronic device is moving;
determine whether the detected distance is in a preset distance range between 0 centimeter to 10 centimeter;
control the light emitting unit mounted on a second surface of the electronic device to emit light for lighting when the detected distance is in the preset distance range, or
control the display screen mounted on a first surface of the electronic device to emit light for lighting when the detected distance is not in the preset distance range, wherein the first surface is opposite to the second surface.

9. The night-light control method as recited in claim 8, wherein the light intensity value in the first preset light intensity range corresponds to the intensity value of the dark environment.

10. The night-light control method as recited in claim 8, further comprising:
determine whether the light intensity value is in a second preset light intensity range; and
turn off the night-light function of the electronic device when the light intensity value is in the second preset light intensity range.

11. The night-light control method as recited in claim 8, further comprising:
turn on/off the night-light function of the electronic device in response to a turning on operation or a turning off operation.

12. The night-light control method as recited in claim 11, further comprising:
display a selection interface on the display screen, wherein the selection interface comprises an on option and an off option;
turn on the night-light function of the electronic device when the user selects the on option of the selection interface; or
turn off the night-light function of the electronic device when the user selects the off option of the selection interface.

13. The night-light control method as recited in claim 8, further comprising:
display a setting sub-interface for setting an execution time of the night-light function of the electronic device; and
execute the night-light function at the execution time.

14. The night-light control method as recited in claim 8, further comprising:
store and mark a target time when the light intensity value detected by the photosensitive sensors is in the first light intensity range, and store and mark a frequency of occurrence of the at least one target time;
determine whether the occurring frequency of the target time is more than a preset frequency; and turn on the night-light function of the electronic device at the target time when the occurring frequency of the target time is more than the preset frequency.

* * * * *